United States Patent
Klicpera (10) Patent No.: US 11,849,222 B2
(45) Date of Patent: Dec. 19, 2023

(54) AUTO CALIBRATION PROCEDURE FOR EXTERNAL LIGHTS ATTACHED TO MACHINE VISION SYSTEM OPERATING ON POWER OVER ETHERNET

(71) Applicant: ZEBRA TECHNOLOGIES CORPORATION, Lincolnshire, IL (US)

(72) Inventor: Christopher P. Klicpera, Westbury, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 263 days.

(21) Appl. No.: 17/183,794

(22) Filed: Feb. 24, 2021

(65) Prior Publication Data

US 2022/0272248 A1    Aug. 25, 2022

(51) Int. Cl.
| | | |
|---|---|---|
| H04N 23/74 | (2023.01) | |
| H04L 12/10 | (2006.01) | |
| F21S 9/02 | (2006.01) | |
| G06T 7/00 | (2017.01) | |
| H05B 47/11 | (2020.01) | |
| H05B 47/14 | (2020.01) | |

(52) U.S. Cl.
CPC ............... *H04N 23/74* (2023.01); *F21S 9/02* (2013.01); *G06T 7/0004* (2013.01); *H04L 12/10* (2013.01); *H05B 47/11* (2020.01); *H05B 47/14* (2020.01)

(58) Field of Classification Search
CPC ........ H05B 47/11; H05B 47/14; H05B 47/17; F21S 9/02; G06T 7/0004; H04N 23/74; H04N 23/65; H04L 12/10
See application file for complete search history.

(56) References Cited

U.S. PATENT DOCUMENTS

| | | | | |
|---|---|---|---|---|
| 10,152,915 | B2 * | 12/2018 | Chaji | .............. G09G 3/20 |
| 10,212,319 | B1 * | 2/2019 | Carter, II | ............ H04N 5/2354 |
| 11,013,078 | B2 * | 5/2021 | Lys | ................ F21S 2/00 |
| 11,076,536 | B2 * | 8/2021 | Lys | .............. F21V 29/56 |
| 11,153,503 | B1 * | 10/2021 | Ebrahimi Afrouzi | .... G05D 3/10 |
| 2010/0228513 | A1 | 9/2010 | Roth et al. | |
| 2013/0241442 | A1 * | 9/2013 | Trattler | ............... G03B 15/05 |
| | | | | 315/307 |

(Continued)

FOREIGN PATENT DOCUMENTS

WO    WO-2016145264 A1 *    9/2016    ............. F21K 9/27

OTHER PUBLICATIONS

International Search Report and Written Opinion for International Application No. PCT/US2022/011244 dated Apr. 11, 2022.

*Primary Examiner* — Abdullah A Riyami
*Assistant Examiner* — Syed M Kaiser
(74) *Attorney, Agent, or Firm* — Yuri Astvatsaturov (57) ABSTRACT

Methods and systems for automatically calibrating external illumination sources are disclosed herein. An example method includes supplying power over Ethernet (PoE) to an imaging assembly. The example method may further include identifying a characteristic corresponding to an external illumination source connected to the imaging assembly. The example method may further include adjusting an output intensity of the external illumination source based upon the characteristic, wherein the imaging assembly supplies the PoE to the external illumination source.

18 Claims, 2 Drawing Sheets

(56) References Cited

U.S. PATENT DOCUMENTS

| | | | |
|---|---|---|---|
| 2015/0195883 A1* | 7/2015 | Harris | H05B 47/19 |
| | | | 315/158 |
| 2016/0072990 A1* | 3/2016 | Dinev | H04N 23/51 |
| | | | 348/207.11 |
| 2016/0072991 A1 | 3/2016 | Dinev | |
| 2016/0183351 A1 | 6/2016 | Snyder et al. | |
| 2017/0231066 A1* | 8/2017 | Roberts | H04L 67/12 |
| 2018/0177026 A1* | 6/2018 | Bowser | H05B 47/11 |
| 2018/0339158 A1* | 11/2018 | Taylor | H05B 45/00 |

* cited by examiner

AUTO CALIBRATION PROCEDURE FOR EXTERNAL LIGHTS ATTACHED TO MACHINE VISION SYSTEM OPERATING ON POWER OVER ETHERNET

BACKGROUND

Many prominent industries require high-fidelity inspection processes to ensure a consistent, quality product. Conventionally, achieving this inspection standard involves machine vision (MV) systems. Generally speaking, MV enables a camera-based system to acquire and analyze image data for inspection purposes. Such image data analysis requires well illuminated images to produce the resolution, contrast, and other image characteristics necessary to perform machine vision techniques.

To ensure each captured image is sufficiently illuminated, many conventional MV systems require high current external illumination accessories that are controlled and powered by the MV camera. Typically, these accessories require a dedicated 24 Volt (V) power supply that is directly connected to the MV system. However, these accessories can be bulky and expensive, so many users attempt to circumvent purchasing and installing these accessories by opting to provide the additional power through Power over Ethernet (PoE) technology. Unfortunately, a common issue is that PoE technology cannot supply enough power for adequate external illumination because the accessories exceed the current limits that PoE provides.

Accordingly, there is a need for a way to supply ample power to external illumination devices for machine vision cameras utilizing PoE technology.

SUMMARY

In an embodiment, the present invention is a method for automatically calibrating external illumination sources. The method may include supplying power over Ethernet (PoE) to an imaging assembly; identifying a characteristic corresponding to an external illumination source connected to the imaging assembly; and adjusting an output intensity of the external illumination source based upon the characteristic, wherein the imaging assembly supplies the PoE to the external illumination source.

In a variation of this embodiment, identifying the characteristic corresponding to the external illumination source further comprises: activating the imaging assembly at a maximum power mode; measuring an imaging operating current corresponding to the maximum power mode of the imaging assembly; and determining a current budget based upon the imaging operating current.

In another variation of this embodiment, measuring the imaging operating current corresponding to the maximum power mode of the imaging assembly further comprises: measuring the imaging operating current once during a development stage of the imaging assembly.

In yet another variation of this embodiment, measuring the imaging operating current corresponding to the maximum power mode of the imaging assembly further comprises: measuring the imaging operating current dynamically during a run time of the imaging assembly.

In still another variation of this embodiment, the characteristic is a current budget, and adjusting an output intensity of the external illumination source based upon the characteristic further comprises: activating the external illumination source at a minimum output intensity; measuring an illumination operating current corresponding to the minimum output intensity of the external illumination source; and comparing the illumination operating current to the current budget. Further in these variations, and responsive to determining that the illumination operating current is less than a threshold value of the current budget, the method further comprises: iteratively adjusting the output intensity of the external illumination source until the illumination operating current is greater than the threshold value and less than the current budget.

In yet another variation of this embodiment, the method further comprises: disabling one or more output intensity levels associated with the external illumination source based upon the adjusted output intensity.

In still another variation of this embodiment, the method further comprises: identifying a first characteristic corresponding to the external illumination source during a first duration D1; adjusting the output intensity of the external illumination source to a first output intensity based upon the first characteristic identified during the first duration D1; identifying a second characteristic corresponding to the external illumination source that is different from the first characteristic during a second duration D2 that is different from the first duration D1; and adjusting the output intensity of the external illumination source to a second output intensity based upon the second characteristic identified during the second duration D2, wherein the second output intensity is different from the first output intensity.

In another embodiment, the present invention is a system for automatically calibrating external illumination sources. The system may include a power supply configured to supply power over Ethernet (PoE), an external illumination source, and an imaging assembly coupled with the power supply and the external illumination source. The imaging assembly may be configured to identify a characteristic corresponding to the external illumination source, and adjust an output intensity of the external illumination source based upon the characteristic, wherein the imaging assembly supplies the PoE to the external illumination source.

In a variation of this embodiment, the imaging assembly is a machine vision imaging assembly configured to capture an image via a machine vision protocol.

In yet another embodiment, the present invention is a tangible machine-readable medium comprising instructions that, when executed, cause a machine to at least: identify a characteristic corresponding to an external illumination source that is connected to an imaging assembly; and adjust an output intensity of the external illumination source based upon the characteristic, wherein the imaging assembly supplies power over Ethernet (PoE) to the external illumination source.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various embodiments of the present disclosure, systems and methods for automatically calibrating external illumination sources are described. The systems provide solutions where, e.g., machine vision (MV) systems require variable amounts of illumination and/or typically draw higher currents than conventional Power over Ethernet (PoE) architectures allow. As used herein, "Power over Ethernet" and "PoE" are to be understood as referencing the definitions provided by the relevant standards (e.g., IEEE 802.3), as known to a person of ordinary skill in the art.

Generally speaking, MV systems benefit from increased illumination levels. Increased illumination levels allow the MV system to acquire finer resolution images, and correspondingly achieve higher accuracy in the final analysis. In many installations utilizing MV systems (e.g., automotive and industrial inspection), consumers implement external illumination sources to provide increased illumination levels for the MV systems. In fact, data from field studies indicates that over 70% of such installations use external illumination sources. Problematically, however, powering such external illumination sources has proven to be a challenge.

Standard external illumination sources for industrial use cases have power output capabilities exceeding 50 watts (W). However, as mentioned, conventional MV cameras typically operate on a 24 V power supply, and the external illumination sources can thereby overload the power supply by drawing high current levels to reach a maximum power output. Consumers may not require the external illumination source to output maximum power for their particular MV application, so it is critical for these consumers to determine a maximum current the external illumination source can draw from a particular power supply without overloading the power supply (e.g., a "current budget"). A consumer may resort to trial and error to determine a current budget for the external illumination source, but doing so can risk damage to the MV system. As a result, many consumers may be forced to purchase an additional power supply to increase their current budget or operate without the external illumination source entirely.

Typically, a consumer may purchase an external (e.g., additional) power supply with a particular power demand in mind. For example, assume a consumer determines that an imaging system may require a maximum power supply of 50 W at any given time. The consumer may purchase a 50 W external power supply to ensure that the imaging system or any component thereof may operate at any suitable power level without exceeding the maximum power supply available from (e.g., overload) the external power supply. Thus, using an external power supply would typically eliminate the need to calibrate acceptable power level draws of imaging system components because the external power supply would enable all components to draw the maximum power possible. Moreover, most conventional external power supplies include some reserve capacity to handle surplus loads, so if the imaging system briefly exceeds the 50 W limit, the external power supply would likely compensate for the temporarily increased power demand without the imaging system overloading. However, in many situations, a consumer may purchase an external power supply capable of providing more power than the imaging system may typically (or possibly) require in order to avoid the possibility of a system overload. Thus, for conventional imaging systems, the consumer would generally purchase an external power supply specifically to meet (or exceed) the power demands of the imaging system and eliminate the need for system power calibration.

Unfortunately, such simple solutions are generally unavailable for systems utilizing PoE. The power supply available via PoE is rigidly defined in accordance with several standards, such that PoE power supplies may only supply 15 W or 30 W. Further, the standards do not allow PoE power supplies to maintain a reserve capacity, and therefore may render PoE power supplies unable to handle surplus loads. Thus, a consumer opting to use a PoE power supply for an imaging system would traditionally substantially reduce the number of imaging components (e.g., external illumination sources) available for use within the imaging system because the power draw of the collective imaging system had to be within the tolerance of the PoE power supply. Moreover, any components integrated into the imaging system that may exceed the power supply tolerance of the PoE power supply would require manual calibration, which is time intensive and often inaccurate, resulting in the entire imaging system being taken offline (e.g., out of use) for large periods of time to properly calibrate the additional components. As a result, PoE would traditionally be unusable as a power source for imaging systems/components with maximum power draws exceeding these two levels (15/30 W).

Thus, the disclosure of the present application resolves such issues by automatically calibrating external illumination sources that are included as part of a MV system utilizing a PoE power supply. In this manner, the disclosure of the present application alleviates the burden of funding, installing, and maintaining bulky, expensive industrial power supplies and achieves various advantages. Namely, the automatic calibration systems and methods disclosed herein automatically calibrate the output power of an external illumination source connected to a MV camera to draw current levels within a tolerance of the PoE power supply. Moreover, the automatic calibration systems and methods described herein may prevent a user from overloading the PoE power supply for a MV system by determining a current budget available for the external illumination source and disabling a user from allowing the external illumination source to draw current above the current budget.

Thus, the automatic calibration systems and methods of the present disclosure provide a unique and identifiable improvement over prior art systems by enabling MV cameras to adequately and locally power external illumination systems using PoE, resulting in reduced cost (e.g., from purchasing additional external power supplies and from damage resulting from overloading the PoE power supply) and increased machine vision system performance and consumer satisfaction. Further, the automatic calibration systems and methods of the present disclosure allow a consumer to fluidly and quickly integrate any external illumination source into their pre-configured machine vision system without tediously calibrating the external illumination source. As a result, consumers may easily and efficiently swap external illumination sources to fit their precise illumination needs for specific machine vision tasks.

Figure 1:
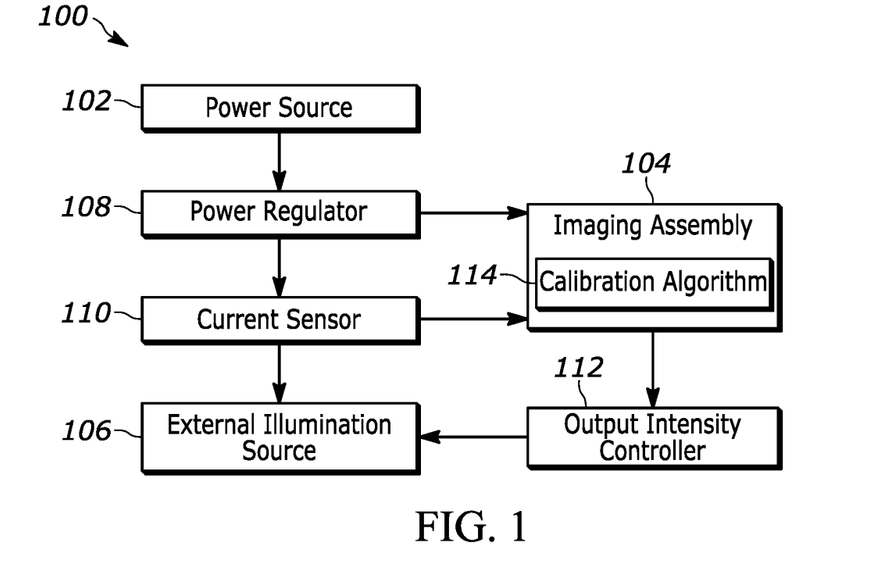
FIG. 1 illustrates an example system for automatically calibrating external illumination sources, in accordance with embodiments described herein.

FIG. 1 illustrates an example system 100, in accordance with various embodiments of the present disclosure. The example system 100 may include a power source 102, an imaging assembly 104, an external illumination source 106, a power regulator 108, a current sensor 110, and an output intensity controller 112. The imaging assembly 104 may also include a calibration algorithm 114 configured to automatically calibrate the external illumination source 106 for use with the power source 102 and the imaging assembly 104, as part of the example system 100.

Generally, the imaging assembly 104 operates to capture images of various environments and analyze those images to determine desired characteristics of the objects and/or areas of interest contained therein. Correspondingly, it is to be understood that the imaging assembly 104 may include all components necessary to perform standard machine vision protocols. For example, the imaging assembly 104 may include a processor (not shown), a memory (not shown), and a transceiver (not shown). Moreover, while referenced herein as a "processor" and a "memory," it is to be understood that, in embodiments, the processor may include two or more processors and the memory may include two or more memories.

To facilitate image capture and analysis, and as further described herein, the power source 102 may provide power to camera subsystems of the imaging assembly 104. Using this power, the camera subsystems may capture the images of the various environments. In embodiments, the power source 102 may provide Power over Ethernet (PoE) to the imaging assembly 104 through the power regulator 108. Accordingly, the power source 102 may be a PoE compatible Ethernet switch that transmits direct current (DC) power to the power regulator 108, thereby powering the imaging assembly 104. Moreover, in certain aspects, the power regulator 108 may be included as part of the imaging assembly 104. For example, the power source 102 may supply 48 volts (V) to the power regulator 108 that converts the supplied voltage to 24 V for direct supply to the imaging assembly 104.

As previously mentioned, to enable high fidelity image processing, the imaging assembly 104 may require considerable external illumination. Thus, the external illumination source 106 may provide such external illumination. As discussed further herein, the imaging assembly 104 may determine the amount of power supplied by the power source 102 to supply to the external illumination source 106. That determination may be based, in part, upon the measurements provided by the current sensor 110 to the imaging assembly 104. Generally, the current sensor 110 measures the current (e.g., in Amperes (A)) being drawn by the external illumination source 106, and as supplied by the imaging assembly 104. The current sensor 110 may then transmit this measured current to the imaging assembly 104, wherein the measured current may be used by the calibration algorithm 114, as discussed further herein.

Further, the imaging assembly 104 may supply power to the external illumination source 106. The output intensity controller 112 may be an analog output that may provide voltage to an analog input of the external illumination source 106 within a range of, for example, 0 V to 10 V, in accordance with an intensity control setting (e.g., as determined by the calibration algorithm 114). The output intensity controller 112 output may be interpreted by the external light 106 as a linearly scaled intensity, which may be expressed as a percentage of the maximum output intensity of the external illumination source 106. For example, assume that the external illumination source 106 may draw 1 A of current corresponding to a maximum output intensity at a 10 V intensity control setting. In this example, the output intensity controller 112 may output 2V to the analog input of the external illumination source 106, such that the external illumination source 106 outputs light at 20% intensity while consuming 0.2 A of current.

Figure 2:
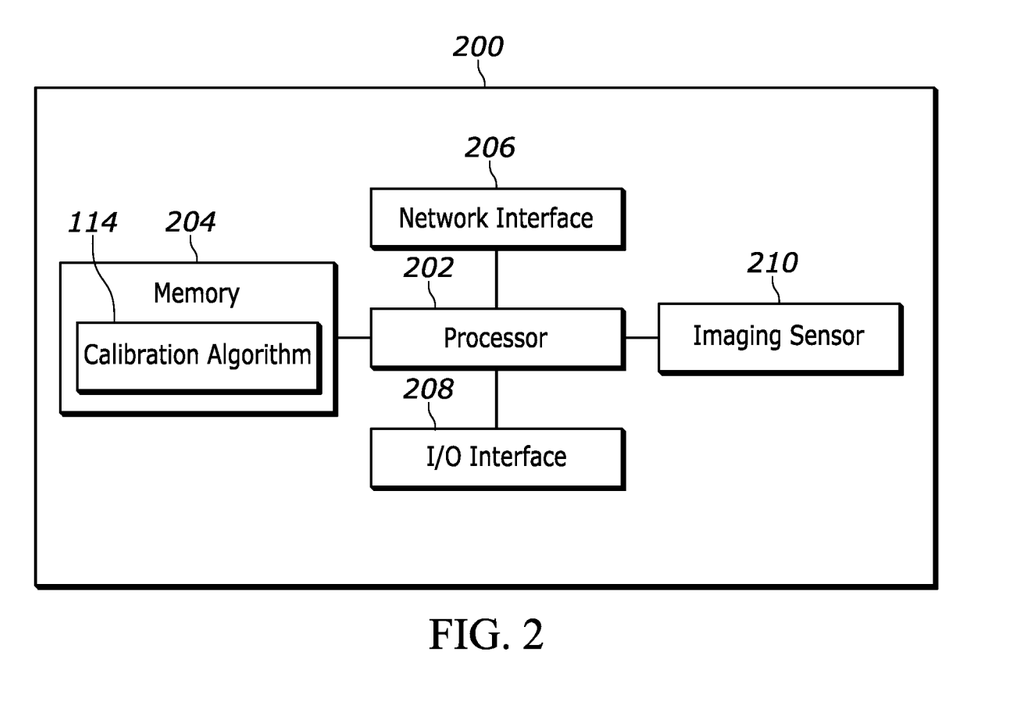
FIG. 2 is a block diagram of an example logic circuit for implementing example methods and/or operations described herein.

FIG. 2 is a block diagram representative of an example logic circuit capable of implementing, for example, one or more components of the example machine vision system 100 of FIG. 1 or, more generally, the example imaging apparatus 104 of FIG. 1. The example logic circuit of FIG. 2 is a processing platform 200 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 200 of FIG. 2 includes a processor 202 such as, for example, one or more microprocessors, controllers, and/or any suitable type of processor. The example processing platform 200 of FIG. 2 includes memory (e.g., volatile memory, non-volatile memory) 204 accessible by the processor 202 (e.g., via a memory controller). The example processor 202 interacts with the memory 204 to obtain, for example, machine-readable instructions stored in the memory 204 corresponding to, for example, the operations represented by the flowcharts of this disclosure. The memory 204 also includes the calibration algorithm 114 of FIG. 1 that is accessible by the example processor 202. The calibration algorithm 114 may comprise rule-based instructions, an artificial intelligence (AI) and/or machine learning-based model, and/or any other suitable algorithm architecture or combination thereof configured to automatically calibrate an external illumination source (e.g., external illumination source 106). For example, the example processor 202 may access the memory 204 to execute the calibration algorithm 114 when the external illumination source 106 is initially coupled to the power source 102 and the imaging assembly 104, as part of the example system 100. Additionally or alternatively, machine-readable instructions corresponding to the example operations described herein may be stored on one or more removable media (e.g., a compact disc, a digital versatile disc, removable flash memory, etc.) that may be coupled to the processing platform 200 to provide access to the machine-readable instructions stored thereon.

The example processing platform 200 of FIG. 2 also includes a networking interface 206 to enable communication with other machines via, for example, one or more networks. The example networking interface 206 includes any suitable type of communication interface(s) (e.g., wired and/or wireless interfaces) configured to operate in accordance with any suitable protocol(s).

The example processing platform 200 of FIG. 2 also includes input/output (I/O) interfaces 208 to enable receipt of user input and communication of output data to the user.

The example processing platform 200 of FIG. 2 also includes an imaging sensor 210 to enable the capture of image data by, for example, the imaging apparatus 104. The imaging sensor 210 may be any sensor configured to capture data suitable for image analysis. For example, the imaging sensor 210 may be a red-green-blue (RGB) camera configured to capture two-dimensional (2D) image data suitable for machine vision techniques.

Figure 3:
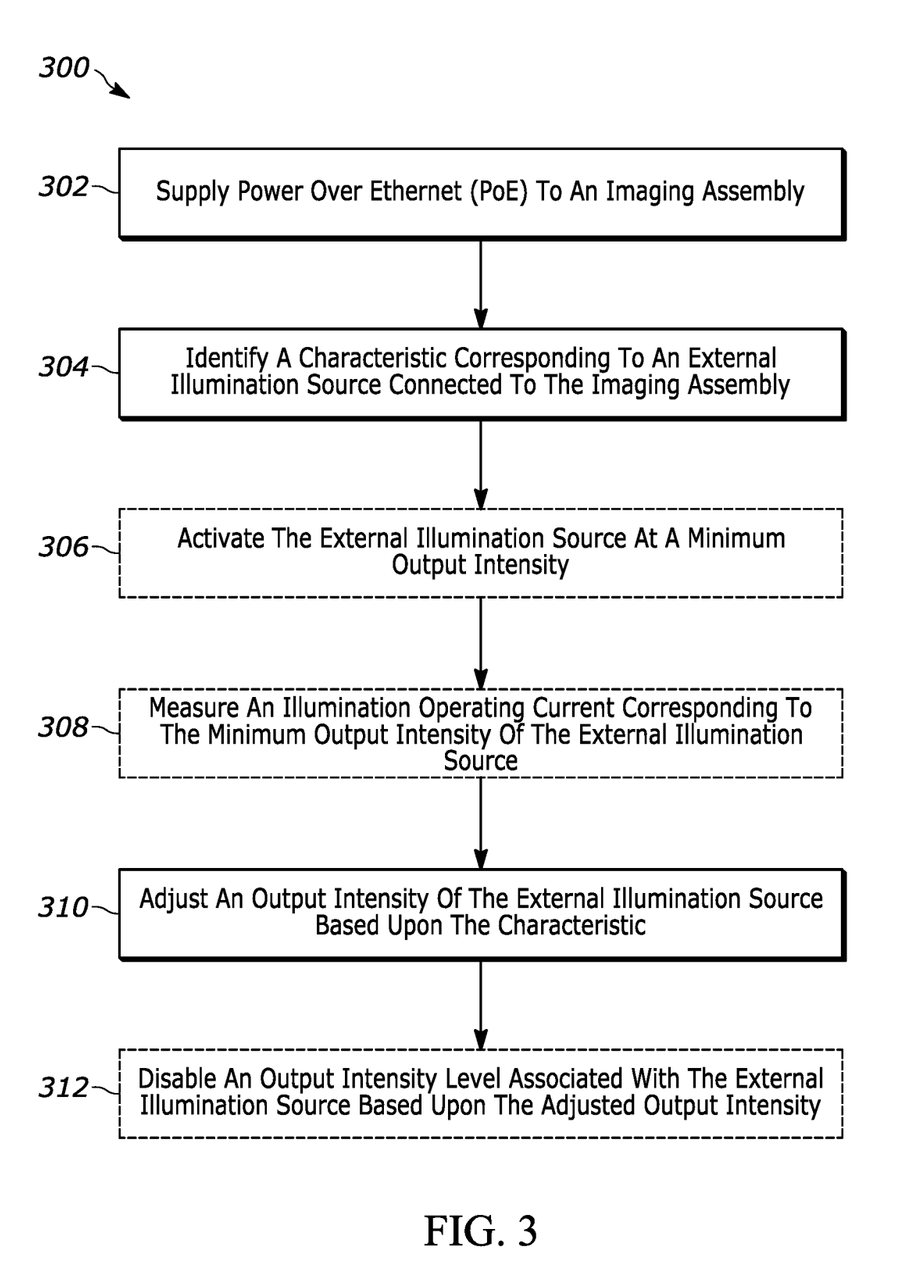
FIG. 3 is a flowchart representative of a method for automatically calibrating external illumination sources, in accordance with embodiments described herein.

FIG. 3 is a flowchart representative of a method 300 for automatically calibrating external illumination sources, in accordance with embodiments described herein. The method 300 may broadly describe various methods for automatically calibrating external illumination sources. Generally speaking, and as mentioned above, the method 300 for automatically calibrating external illumination sources describes utilizing a PoE power supply (e.g., power source 102) and a machine vision camera (e.g., imaging assembly 104) to identify characteristics of the external illumination source (e.g., external illumination source 106). Using these characteristics, the machine vision camera may adjust an output intensity of the external illumination source to, for example, provide increased illumination (e.g., increase the output intensity). It is to be appreciated that any suitable measurement metric or combinations thereof may be used to represent the power, current, output intensity, and/or any other measurement associated with the method 300. It is also to be understood that any of the steps of the method 300 may be performed by, for example, the imaging assembly 104, the calibration algorithm 114, the processor 202, and/or any other suitable components or combinations thereof discussed herein, and that the steps of the method 300 may be performed automatically (e.g., without user/operator input/prompt) by any/each of these devices/components. Further, in embodiments, the imaging assembly 104 may not include machine vision capabilities, and the imaging assembly 104 may transmit captured image data to a remote location (e.g., a hosting server) for the image data processing and analysis actions described herein.

At block 302, the method 300 may include supplying PoE (e.g., via power source 102) to an imaging assembly (e.g., imaging assembly 104). Generally, and as previously mentioned, the imaging assembly 104 may draw power from the power source 102 in accordance with the voltage supplied through a power regulator (e.g., the power regulator 108) configured to supply an appropriate voltage for the imaging assembly 104. In embodiments, the imaging assembly 104 is a machine vision imaging assembly configured to capture an image via a machine vision protocol. These machine vision protocols may include, for example, optical character recognition (OCR), facial recognition, edge detection, image segmentation, and/or any other suitable machine vision techniques or combinations thereof.

At block 304, the method 300 may include identifying a characteristic corresponding to an external illumination source (e.g., external illumination source 106) connected to the imaging assembly 104. Generally, the characteristic may indicate an amount of available current that the external illumination source 106 may draw from the power source 102 to enable illumination from the external illumination source 106 (e.g., the "current budget"). The calibration algorithm 114 may identify this characteristic by determining operating characteristics of the imaging assembly 104. Namely, the calibration algorithm 114 may determine how much imaging operating current the imaging assembly 104 pulls from the power source 102 during operation to then determine the remaining current budget that may be allocated to the external illumination source 106. Of course, it is to be understood that determining the operating characteristics of the imaging assembly 104 may be performed manually by an operator during off-line operation of the imaging assembly 104 (e.g., not during a live machine vision task). Moreover, during an off-line determination of the operating characteristics of the imaging assembly 104, an external illumination source 106 need not be connected as part of the imaging system (e.g., example system 100). Specifically, the operating characteristics of the imaging assembly 104 may be determined without connecting an external illumination source 106 to the system (e.g., 100).

In any event, in embodiments, the calibration algorithm 114 may determine the imaging operating current required by the imaging assembly 104 by activating the imaging assembly 104 at a maximum power mode. For example, if the imaging assembly 104 may operate between 1 W and 10 W, the calibration algorithm 114 may activate the imaging assembly 104 to operate at 10 W (in this example, the maximum power mode) to measure the current the imaging assembly 104 draws at that maximum power mode. Typically, the imaging assembly 104 may not operate at the maximum power mode during normal operation, but the calibration algorithm 114 activates the imaging assembly 104 at the maximum power mode to determine the maximum current draw the imaging assembly 104 may possibly need at any point during normal operation.

In practice, the calibration algorithm 114 may simultaneously activate the imaging assembly 104 at the maximum power mode and cause the power regulator 108 to supply a minimum operating voltage. The current drawn by the imaging assembly 104 is related to the voltage supplied and the output power in a well-known relationship (e.g., $P=V*I$, where P is output power, V is voltage supplied, and I is current drawn), so for a given maximum power output of the imaging assembly 104, the imaging assembly 104 may draw a fixed maximum current if the voltage supplied by the power regulator 108 is fixed (e.g., 24 V). For example, assume that the power source 102 supplies 30 W of power, that the imaging assembly 104 has a maximum power mode corresponding to a power output of 5 W, and that the power regulator 108 may supply a fixed 24 V to the imaging assembly 104. In this example, the imaging assembly 104 may theoretically draw a maximum current of approximately 0.2 A to operate in the maximum power mode of 5 W. Of course, some theoretical current draws, voltage supplies, and power outputs over a known threshold may not be practically feasible, so the maximum power mode may be constrained by the calibration algorithm based upon these known practical thresholds. Additionally, it is to be understood that certain additional factors (e.g., cable loss, system efficiency, etc.) are not included in the example calculations described above and herein for simplicity, and that the calibration algorithm 114 may incorporate such additional factors into any suitable determinations/calculations.

Moreover, the current budget may be determined based upon the constant voltage supplied by the power source 102 and converted by the power regulator 108. For example, assume that the power source 102 is configured to supply approximately 15 W of power to the imaging assembly 104 and external illumination source 106. If the power regulator 108 converts 48 V supplied by the power source 102 to 24 V to power the imaging assembly 104 and the external illumination source 106, the calibration algorithm 114 may determine that the imaging assembly 104 and external illumination source 106 may collectively draw up to 0.5 A to reach the maximum power output of approximately 15 W supplied by the power source 102. The calibration algorithm 114 may also determine that the imaging assembly 104 may draw up to 0.2 A to reach a known maximum power mode of approximately 5 W. Thus, the calibration algorithm 114 may also determine that the current drawn by the external illumination source 106 may not exceed 0.3 A (e.g., the "current budget" of this example). As a result, the output intensity controller 112 may provide up to 3 V to the analog input of the external illumination source 106, thereby limiting light output to 30%, corresponding to 0.3 A of current from the power regulator 108.

In this manner, the calibration algorithm 114 may determine the absolute maximum current the imaging assembly 104 may potentially draw under even the most unlikely of operating circumstances. Thus, the calibration algorithm 114 may measure an imaging operating current corresponding to the maximum power mode of the imaging assembly 104 (e.g., the "maximum current draw" of the imaging assembly 104), and may determine a current budget based upon the imaging operating current corresponding to the maximum power mode. In embodiments, the calibration algorithm 114 may measure the imaging operating current and determine the current budget once during a development stage of the imaging assembly (e.g., during off-line operation of the imaging assembly 104). Further, in some embodiments, the calibration algorithm 114 may measure the imaging operating current and determine the current budget dynamically during a run time of the imaging assembly (e.g., during a live machine vision task).

At optional block 306, the method 300 may include activating the external illumination source 106 at a minimum output intensity. The minimum output intensity may generally refer to the minimum intensity of illumination the external illumination source 106 is capable of emitting. For example, if the external illumination source 106 is rated to output illumination at intensities corresponding to power outputs ranging from 1 W to 100 W, then the 1 W output power may correspond to the minimum output intensity of the external illumination source 106.

Generally, the calibration algorithm 114 may activate the external illumination source 106 at the minimum output intensity as a precautionary measure to avoid overloading the power source 102. For example, assume that the power source 102 is configured to supply 15 W of power to the imaging assembly 104 and external illumination source 106 combinations. Further, assume that the imaging assembly 104 draws 10 W from the power source 102, leaving 5 W for the external illumination source 106. If the external illumination source 106 activates to provide 12 W of illumination and draws 0.5 A of current at the 24 V from the power regulator 108, the external illumination source 106 will overload the power source 102 because it is attempting to draw 7 additional watts of power from the power source 102 than it is capable of providing. Accordingly, to avoid these potentially damaging/dangerous outcomes, the calibration algorithm 114 may activate the external illumination source 106 at the minimum output intensity.

At optional block 308, the method 300 may include measuring an illumination operating current corresponding to the minimum output intensity of the external illumination source 106. The calibration algorithm 114 may enable the external illumination source 106 to operate on a 100% duty cycle while operating at the minimum output intensity, so that the current sensor 110 has sufficient time to accurately measure the current drawn by the external illumination source 106. For example, the current sensor 110 may have a corresponding integration time, during which, the current sensor 110 requires a constant input signal (e.g., current reading) from the external illumination source 106 in order to measure the current drawn by the external illumination source 106.

In embodiments, the calibration algorithm 114 may compare the illumination operating current to the current budget. As an example, assume that the illumination operating current is 0.1 A and the current budget is 0.15 A. The calibration algorithm 114 may compare the illumination operating current to the current budget to determine that the illumination operating current is less than the current budget. In this example, the calibration algorithm 114 may additionally determine that the illumination operating current may be increased to provide additional illumination to facilitate the machine vision tasks performed by the imaging assembly 104. As another example, assume that the illumination operating current is 0.2 A and the current budget is 0.1 A. The calibration algorithm 114 may compare the illumination operating current to the current budget to determine that the illumination operating current is greater than the current budget. In this example, the calibration algorithm 114 may additionally determine that the illumination operating current should be reduced to avoid overloading the power source 102.

At block 310, the method 300 may include adjusting an output intensity of the external illumination source based upon the characteristic. The imaging assembly may generally adjust (e.g., by executing the calibration algorithm 114) the output intensity of the external illumination source by causing the output intensity controller to adjust voltage levels (e.g., from 0 V to 10 V) from the 24 V supplied by the imaging assembly (referenced also herein as adjusting "intensity control settings"). Continuing an above example, assume that a PoE power source (e.g., power source 102) is configured to supply 15 W of power to an imaging assembly (e.g., imaging assembly 104) and an external illumination source (e.g., external illumination source 106) combination. In this example, assume that the imaging assembly 104 draws 10 W from the power source 102, leaving 5 W for the external illumination source 106. Further, assume that the intensity control setting causes the output intensity controller to provide 1 V to the external illumination source 106, causing the external illumination source 106 to draw 0.1 A of current at 24 V, yielding approximately 2.4 W of output intensity. The calibration algorithm 114 may determine a current budget of approximately 0.2 A, and may therefore also determine that the illumination operating current (0.1 A, in this example) is less than the current budget. Accordingly, the calibration algorithm 114 may adjust the intensity control setting from 1 V to 2 V, and as a result, may increase the current drawn by the external illumination source 106 from 0.1 A to 0.2 A (increasing the output intensity from approximately 2.4 W to approximately 4.8 W).

In embodiments, and responsive to determining that the illumination operating current is less than a threshold value of the current budget, the calibration algorithm (e.g., calibration algorithm 114) may iteratively adjust the output intensity of the external illumination source until the illumination operating current is greater than the threshold value and less than the current budget. Generally, the calibration algorithm 114 may include and/or determine a threshold value corresponding to the current budget that may represent a percentage of the current budget the calibration algorithm 114 compares to the illumination operating current to determine a maximum output intensity of an external illumination source.

For example, assume that a system (e.g., example system 100) has a current budget associated with an external illumination source of 0.3 A, and that the calibration algorithm 114 includes and/or determines a threshold value of 95% of the current budget (e.g., 0.285 A). In this example, once the illumination operating current equals or exceeds 0.285 A, the calibration algorithm 114 may determine that the external illumination source has reached the maximum output intensity. Of course, if the calibration algorithm 114 determines that the illumination operating current exceeds both the threshold value and the current budget (e.g., the illumination operating current is 0.31 A), the calibration algorithm 114 may iteratively reduce the illumination operating current until the calibration algorithm 114 determines that the illumination operating current equals or exceeds the threshold value and is less than or equal to the current budget.

To expand on the above example, assume that the system has a current budget of 0.3 A, the threshold value is 0.285 A (e.g., 95% of the current budget), and that the illumination operating current is 0.2 A. The calibration algorithm 114 may determine that the illumination operating current is less than the current budget and the threshold value, and may therefore be increased. As a result, the calibration algorithm 114 may increase the intensity control setting from 2 V to 2.04 V, and thereby increase the current drawn by the external illumination source from 0.2 A to 0.204 A. The calibration algorithm 114 may compare the adjusted illumination operating current value (0.204 A) to the current budget and threshold value, and determine that the illumination operating current should again be increased.

Accordingly, the calibration algorithm 114 may iteratively compare and increase the illumination operating current value in accordance with the current budget and the threshold value until the illumination operating current equals or exceeds the threshold value without exceeding the current budget. To illustrate using the prior example, the calibration algorithm 114 may iteratively increase the intensity control settings by 0.04 V (e.g., 10 V divided into 255 incremental values) from 2 V to 2.84 V, to thereby iteratively increase the illumination operating current value by 4 mA until it reaches 0.284 A. At this point, the calibration algorithm 114 may again increase the illumination operating current by the 4 mA incremental value, so that the adjusted illumination operating current reaches 0.288 A. The calibration algorithm 114 may compare the adjusted illumination operating current value to the current budget (0.3 A) and the threshold value (0.285 A), and may determine that the adjusted illumination operating current exceeds the threshold value without exceeding the current budget. Thus, the calibration algorithm 114 may determine that the adjusted illumination operating current (0.288 A) corresponds to the maximum output intensity of the external illumination source.

Moreover, in embodiments, the calibration algorithm 114 may identify a first characteristic corresponding to the external illumination source during a first duration $D_1$. Generally, the first duration D1 may correspond to a period of time in which a system (e.g., example system 100) executes a first imaging task and/or first machine vision task. For example, the calibration algorithm 114 may identify that the external illumination source has an associated current budget of 0.3 A during the first imaging task based upon the power requirements of the imaging assembly (e.g., imaging assembly 104). Accordingly, in these embodiments, the calibration algorithm 114 may adjust the output intensity of the external illumination source to a first output intensity based upon the first characteristic identified during the first duration $D_1$. Continuing the prior example, the calibration algorithm 114 may adjust the illumination operating current to less than or equal to 0.3 A, and as a result, the external illumination source may output illumination at the corresponding first output intensity.

Further in these embodiments, the calibration algorithm 114 may identify a second characteristic corresponding to the external illumination source that is different from the first characteristic during a second duration $D_2$ that is different from the first duration $D_1$. Generally, the second characteristic may be different in type (e.g., voltage, current, power, etc.) or magnitude (e.g., 1 V, 2 V, 3 V, etc.) from the first characteristic, and the second duration D2 may be a separate/distinct period of time in which the system executes a second imaging task and/or second machine vision task. It should be understood that the first duration and second duration may overlap in time, and the first imaging task and/or first machine vision task may be identical and/or similar to the second imaging task and/or second machine vision task.

In any event, and continuing the prior example, the calibration algorithm 114 may identify that the external illumination source has an associated current budget of 0.2 A during the second imaging task based upon the power requirements of the imaging assembly (e.g., imaging assembly 104). Accordingly, in these embodiments, the calibration algorithm 114 may adjust the output intensity of the external illumination source to a second output intensity based upon the second characteristic identified during the second duration $D_2$. To illustrate, the calibration algorithm 114 may adjust the illumination operating current to less than or equal to 0.2 A, and as a result, the external illumination source may output illumination at the corresponding second output intensity.

The second output intensity may be different from the first output intensity, but it is to be understood that the second output intensity may be identical to the first output intensity if, for example, the calibration algorithm 114 determines that the illumination operating current should decrease while maintaining the same output intensity. In that case, the calibration algorithm 114 may increase the intensity control setting (e.g., voltage supplied) to the external illumination source and utilize a current regulator or any suitable component to decrease the illumination operating current to thereby maintain the same output intensity.

Moreover, it is to be generally understood that the calibration algorithm 114 may frequently/periodically adjust the output intensity of an external illumination source (e.g., external illumination source 106) in a floating, variable manner to adapt to power demands of the imaging assembly 104. Further, the calibration algorithm 114 may adjust the output intensity of the external illumination source in an iterative and/or singular manner, as described herein.

At optional block 312, the method 300 may include disabling an output intensity level associated with the external illumination source based upon the adjusted output intensity. Generally, the calibration algorithm 114 may determine the maximum output power associated with an external illumination source, and may disable all/some output intensity levels that exceed the maximum output power. The calibration algorithm 114 may disable different output intensity levels depending on the configuration and/or imaging task performed by the system (e.g., example system 100) that may correspond to different maximum output power values for the external illumination source. For example, the calibration algorithm 114 may determine a maximum output power of 5 W that may correspond to an intensity control setting of 3 V for an external illumination source when the system performs a first imaging task. As a result, the calibration algorithm 114 may disable all output intensity levels corresponding to the intensity control setting of greater than 3V for the external illumination source while the system is configured to perform the first imaging task. Accordingly, a user/operator may be unable to select or configure the intensity control settings to provide greater than 3V to the external illumination source while the system is configured to perform the first imaging task.

However, in the prior example, if the user/operator reconfigures the system to perform a second imaging task in which the external illumination source has a maximum allowable output power of 10 W, the calibration algorithm 114 may enable intensity control settings corresponding to output power in the range of 5 W to 10 W. As a result, the user/operator may select intensity control settings and/or otherwise configure the external illumination source to provide power exceeding 5 W and up to 10 W while the system is configured to perform the second imaging task. The calibration algorithm 114 may determine disabled output intensity levels for any suitable configuration of the system, and may store each disabled output intensity level in memory (e.g., memory 204). A user/operator may also prompt the calibration algorithm 114 (e.g., via I/O interface 208) to determine disabled output intensity levels for each configuration of the system, and/or the calibration algorithm 114 may automatically recognize a new configuration of the system and automatically determine one or more disabled output intensity levels corresponding to the new configuration.

The terms transmitter, receiver, and transceiver are used herein for example purposes and should not be construed as limiting. For example, it will be understood that references to an element being a transmitter or a receiver include that element being a transceiver. Furthermore, any reference to an element being a transceiver may include that element being implemented as a transmitter and/or receiver depending on whether the element is sending and/or receiving data.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for automatically calibrating external illumination sources, comprising:
supplying power over Ethernet (PoE) to an imaging assembly;
identifying a characteristic corresponding to an external illumination source connected to the imaging assembly; and
adjusting, via the imaging assembly, an output intensity of the external illumination source based upon the characteristic,
wherein the imaging assembly supplies the PoE to the external illumination source, and
wherein the method further comprises:
identifying a first characteristic corresponding to the external illumination source during a first duration (D1);
adjusting the output intensity of the external illumination source to a first output intensity based upon the first characteristic identified during the first duration (D1);
identifying a second characteristic corresponding to the external illumination source that is different from the first characteristic during a second duration (D2) that is different from the first duration (D1); and
adjusting the output intensity of the external illumination source to a second output intensity based upon the second characteristic identified during the second duration (D2), wherein the second output intensity is different from the first output intensity.

2. The method of claim 1, wherein identifying the characteristic corresponding to the external illumination source further comprises:
activating the imaging assembly at a maximum power mode;
measuring an imaging operating current corresponding to the maximum power mode of the imaging assembly; and
determining a current budget based upon the imaging operating current.

3. The method of claim 2, wherein measuring the imaging operating current corresponding to the maximum power mode of the imaging assembly further comprises:
measuring the imaging operating current once during a development stage of the imaging assembly.

4. The method of claim 2, wherein measuring the imaging operating current corresponding to the maximum power mode of the imaging assembly further comprises:
measuring the imaging operating current dynamically during a run time of the imaging assembly.

5. The method of claim 1, wherein the characteristic is a current budget, and adjusting an output intensity of the external illumination source based upon the characteristic further comprises:
activating the external illumination source at a minimum output intensity;
measuring an illumination operating current corresponding to the minimum output intensity of the external illumination source; and
comparing the illumination operating current to the current budget.

6. The method of claim 5, further comprising:
responsive to determining that the illumination operating current is less than a threshold value of the current budget, iteratively adjusting the output intensity of the external illumination source until the illumination operating current is greater than the threshold value and less than the current budget.

7. The method of claim 1, further comprising:
disabling one or more output intensity levels associated with the external illumination source based upon the adjusted output intensity.

8. A system for automatically calibrating external illumination sources, comprising:
a power supply configured to supply power over Ethernet (PoE);
an external illumination source; and
an imaging assembly coupled with the power supply and the external illumination source, wherein the imaging assembly is configured to:

identify a characteristic corresponding to the external illumination source, and
adjust an output intensity of the external illumination source based upon the characteristic, wherein the imaging assembly supplies the PoE to the external illumination source, and
wherein the imaging assembly is further configured to:
identify a first characteristic corresponding to the external illumination source during a first duration (D1);
adjust the output intensity of the external illumination source to a first output intensity based upon the first characteristic identified during the first duration (D1);
identify a second characteristic corresponding to the external illumination source that is different from the first characteristic during a second duration (D2) that is different from the first duration (D1); and
adjust the output intensity of the external illumination source to a second output intensity based upon the second characteristic identified during the second duration (D2), wherein the second output intensity is different from the first output intensity.

9. The system of claim 8, wherein the imaging assembly is further configured to:
activate at a maximum power mode;
measure an imaging operating current corresponding to the maximum power mode; and
determine a current budget based upon the imaging operating current.

10. The system of claim 8, wherein the characteristic is a current budget, and the imaging assembly is further configured to:
activate the external illumination source at a minimum output intensity;
measure an illumination operating current corresponding to the minimum output intensity of the external illumination source; and
compare the illumination operating current to the current budget.

11. The system of claim 10, wherein the imaging assembly is further configured to:
responsive to determining that the illumination operating current is less than a threshold value of the current budget, iteratively adjust the output intensity of the external illumination source until the illumination operating current is greater than the threshold value and less than the current budget.

12. The system of claim 8, wherein the imaging assembly is further configured to:
disable one or more output intensity levels associated with the external illumination source based upon the adjusted output intensity.

13. The system of claim 8, wherein the imaging assembly is a machine vision imaging assembly configured to capture an image via a machine vision protocol.

14. A tangible machine-readable medium comprising instructions that, when executed, cause a machine to at least:
identify a characteristic corresponding to an external illumination source that is connected to an imaging assembly; and
adjust, via the imaging assembly, an output intensity of the external illumination source based upon the characteristic,
wherein the imaging assembly supplies power over Ethernet (PoE) to the external illumination source, and
wherein the instructions, when executed, further cause the machine to at least:
identify a first characteristic corresponding to the external illumination source during a first duration D1;
adjust the output intensity of the external illumination source to a first output intensity based upon the first characteristic identified during the first duration D1;
identify a second characteristic corresponding to the external illumination source that is different from the first characteristic during a second duration D2 that is different from the first duration D1; and
adjust the output intensity of the external illumination source to a second output intensity based upon the second characteristic identified during the second duration D2, wherein the second output intensity is different from the first output intensity.

15. The tangible machine-readable medium of claim 14, wherein the instructions, when executed, further cause the machine to at least:
activate the imaging assembly at a maximum power mode;
measure an imaging operating current corresponding to the maximum power mode of the imaging assembly; and
determine a current budget based upon the imaging operating current.

16. The tangible machine-readable medium of claim 14, wherein the characteristic is a current budget, and the instructions, when executed, further cause the machine to at least:
activate the external illumination source at a minimum output intensity;
measure an illumination operating current corresponding to the minimum output intensity of the external illumination source; and
compare the illumination operating current to the current budget.

17. The tangible machine-readable medium of claim 16, wherein the instructions, when executed, further cause the machine to at least:
responsive to determining that the illumination operating current is less than a threshold value of the current budget, iteratively adjust the output intensity of the external illumination source until the illumination operating current is greater than the threshold value and less than the current budget.

18. The tangible machine-readable medium of claim 14, wherein the instructions, when executed, further cause the machine to at least:
disable one or more output intensity levels associated with the external illumination source based upon the adjusted output intensity.

* * * * *